June 7, 1966        L. G. SIMJIAN        3,255,439
POSTAGE METERING SYSTEM
Filed Dec. 5, 1962        3 Sheets-Sheet 1
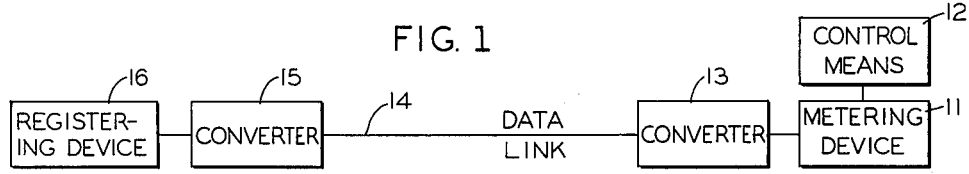
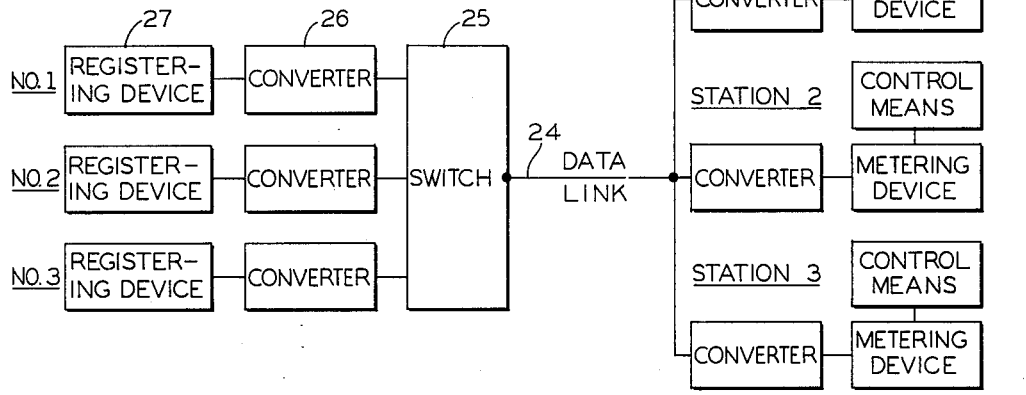
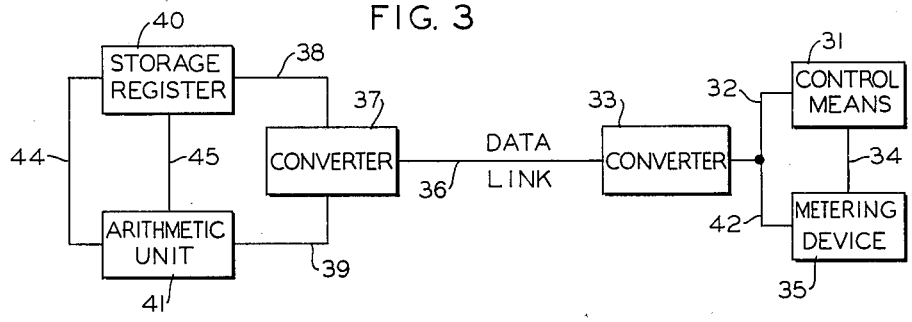
*INVENTOR.*
LUTHER G. SIMJIAN
BY Ervin B. Steinberg
AGENT

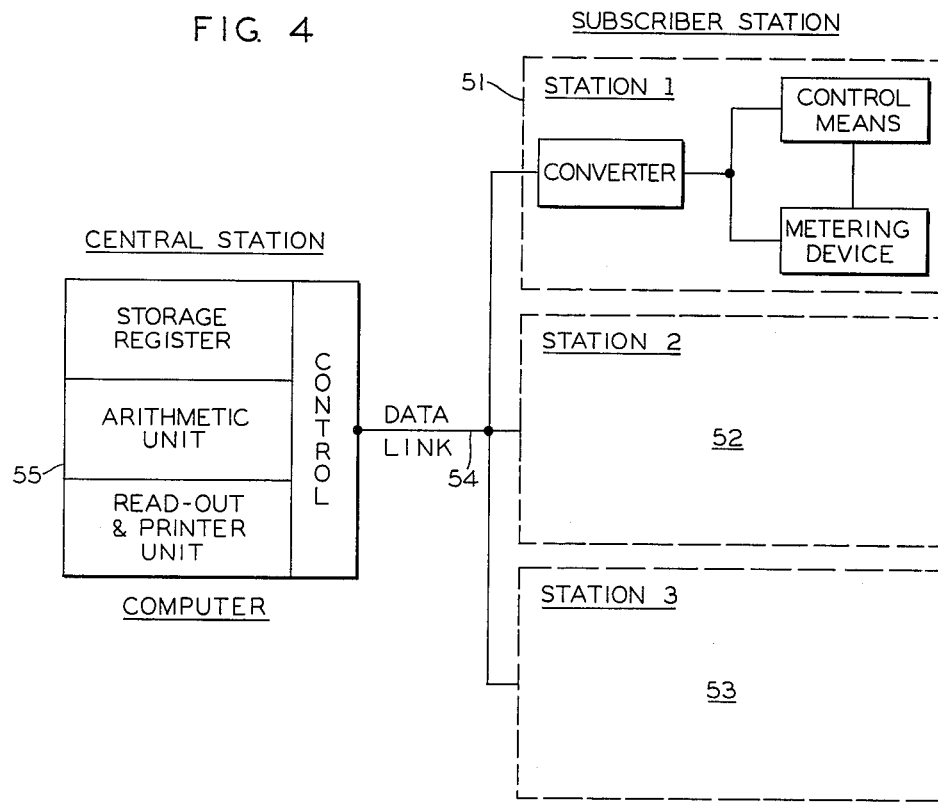

June 7, 1966 L. G. SIMJIAN 3,255,439
POSTAGE METERING SYSTEM
Filed Dec. 5, 1962 3 Sheets-Sheet 3

INVENTOR.
LUTHER G. SIMJIAN
BY
Erwin B. Steinberg
AGENT

United States Patent Office 3,255,439
Patented June 7, 1966

3,255,439
POSTAGE METERING SYSTEM
Luther G. Simjian, Greenwich, Conn., assignor to General Research, Inc., Greenwich, Conn., a corporation of Connecticut
Filed Dec. 5, 1962, Ser. No. 243,209
10 Claims. (Cl. 340—172.5)

This invention refers to a system for recording at a central station the value of articles, goods, or face value of markings dispensed at one or more individual subscriber stations.

This application is a continuation-in-part of my copending application, Ser. No. 123,874, now abandoned, filed on July 13, 1961, which application will now be permitted to lapse without prejudice, in view of its being superseded by this present application.

Although the instant system has varied use in connection with dispensing articles or objects at different locations, it will be described hereafter in connection with one of its primary and preferred purposes, that is, the dispensing of postage validating marks. It shall be understood, however, that the concept disclosed hereafter shall not be limited to this preferred application.

The use of postage meters for cancelling mail by either the feeding of articles to be mailed through the meter while printing means associated therewith affixes markings to the individual articles, or the dispersing of tape ings to the individual articles, or the dispersing of tape value is well known in the art. Postage meters of this type are manufactured for instance, by Pitney Bowes, Inc., of Stamford, Connecticut, and are available for rental or sale to business organizations and individuals. Also, many of these machines are installed in United States Post Offices for providing variable amounts of postage.

When such a postage meter is obtained by a business organization or an individual, it is necessary that the totalizer movement of the postage meter be brought to a local post office. Upon payment of a sum of money, an authorized attendant adjusts the totalizer to a value corresponding to the amount of money deposited with the U.S. Post Office. Subsequently, the totalizer movement is returned to its position in the postage meter and different amounts of postage can be dispensed until an amount equal to the deposit is used. In order to enable the customer to have continuous knowledge of the credit available, the postage meter is provided with ascending and descending counters which indicate respectively the amount of postage used and the amount of credit still remaining.

It will be apparent, therefore, that the post office must deal with many individuals and business concerns and that the totalizer movements must be brought periodically to the post office for setting to the amount of money paid as a deposit.

In the arrangement described hereafter, many of the disadvantages existing heretofore have been eliminated by connecting the postage meters provided at different locations to a central station and maintaining all of the records at this central station. In particular, as disclosed hereafter, one or more of the postage meters are connected by standard telephone circuits to the central station, which may be a telephone office, so that records concerning the individual users are maintained at the central office and billing can be effected by electronic computing means. Moreover, recent advances in transmitting pulses and digital data via ordinary telephone wires make it possible to operate postage meters in the manner indicated heretofore while maintaining records of individual transactions at a central station. In this way, existing computing equipment used for registering and computing telephone or telegram messages can readily be expanded to provide also information concerning the value of postage expended by individual subscribers and, still further, billing for postage can be accomplished in a very simple, easy and convenient manner. No longer will it be necessary for the subscribers to carry their particular totalizer movements to the local post office for adjustment to the value of each new deposit.

One of the objects of this invention, therefore, is the provision of a system for dispensing metered indicia with means for maintaining records of such dispensing operation at a central station.

Another object of this invention is the provision of a system adapted to dispense metered indicia using standard communication transmitting facilities for accounting and control purposes.

Another object of this invention is the provision of a system for dispensing metered indicia at a plurality of subscriber locations while maintaining records at a central station.

A further object of this invention is the provision of a system for dispensing metered indicia at a subscriber station when suitable credit is available, while blocking the dispensing operation when no credit is provided, and using standard communication means for interconnecting the subscriber station with the central station.

A further and other object of this invention is the provision of postage meters connected to a central station and the controlling of the meters by signals from this central station.

Further and still other objects of this invention will be apparent from the following description when taken in conjunction with the accompanying drawings in which:

FIGURE 1 is a schematic block diagram of a basic arrangement for the instant system using a single subscriber station and a central station;

FIGURE 2 is a schematic block diagram of the arrangement substantially as shown in FIGURE 1 using, however, a plurality of subscriber stations;

FIGURE 3 is a schematic block diagram of an alternative and improved metering system using a single subscriber station;

FIGURE 4 is a schematic block diagram of a system similar to that depicted in FIGURE 3, using a plurality of subscriber stations;

Figure 5:
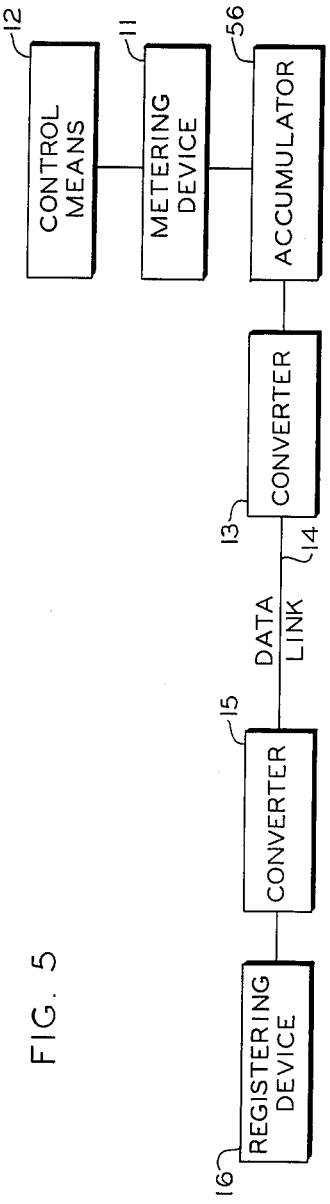
FIGURE 5 is a schematic block diagram of a modification of FIGURE 1.

Referring now to the figures and FIGURE 1 in particular, reference numeral 11 refers to a metering device which may be a postage meter of the type indicated heretofore, which meter is provided with a control means 12. Control means 12 generally comprises suitable means for adjusting the face value of the marking to be imprinted upon the article to be mailed. Alternatively, a strip of tape may be fed through the machine and imprinted with the postage markings, which strip is then affixed upon the article of mail.

The metering device is connected to a converter 13 which is coupled to a data link 14, such as telephone wire or a microwave system, used for transmitting suitable electrical signals to the central station, in this case the telephone office. The central station includes a similar converter 15 and a registering or totalizing device 16, the latter maintaining a record of the amount of postage dispensed by metering device 11. This record keeping is similar to maintaining a count of the number of local or long distance telephone calls made by a subscriber.

The transmission of information via telephone wires is well known in the art and within recent years various devices have come into use to permit such coupling to telephone lines. For instance, interconnecting of digital computers, transmitting of information from magnetic tapes and transmission of data from tabulating cards, transmitting of telemetering data, etc. by telephone wire, all have been described extensively in the literature, see for instance "Automatic Data Processing Systems" (book), by Robert H. Gregory et al., Wadsworth Publishing Company, Inc., San Francisco, California, 1960, L. C. Cat. No. 60–8491, p. 147 et seq., Communication Channels.

In its simplest embodiment, metering device 11 and converter 13 operate in such a manner that converter 13 transmits a binary signal to the converter 15 which signal is responsive to the amount of postage dispensed by metering device 11 during each dispensing operation. For instance, a binary code equivalent to "4" is transmitted for each dispensing of a 4-cent postage unit. A signal equivalent to "32" would indicate an imprint of 32 cents postage, and so forth. Converter 15 converts the binary information back to other signals or shaft rotation for adjusting registering device 16. Obviously, the postage count signal may be a modulated tone signal generated by the converter. In this manner, the amount or postage dispensed at metering device 11 is indicated and stored in registering device 16 and billing can be effected from the central station in the standard manner. Registering device 16 may be fitted with resetting and/or zeroizing means for adjusting the device to a new value whenever payment is made.

FIGURE 2 shows an arrangement wherein several subscriber stations, such as Station 1, Station 2 and Station 3 are connected to a central station. The central station requires of course, the maintenance of a record for each customer and therefore, a like number of registering devices are provided. Each register may comprise a digital counter, magnetic core memory, a magnetic tape or other suitable storage means.

Each customer is provided with a metering device 21, a control means 22 for adjusting the value of postage to be dispensed by the metering device, and a converter 23 which converts the information from the metering device 21 to a signal suitable for transmission via a data link 24 to the central station. Each converter is provided with a subscriber code identifying means in a manner which is similar to the arrangement wherein each telephone subscriber is provided with a particular call number. At the central station, there is provided a switch 25 which receives the signal from the data link 24 and directs the information to the particular converter 26 and registering device 27 associated with the respective subscriber station. The central station, therefore, is provided with information relating to the amount of postage used by each subscriber and billing thereof can be accomplished at regular time intervals.

FIGURE 3 depicts the basic diagram wherein the metering device dispenses postage only upon the presence of a predetermined amount of credit in the storage register at the central station. In operation, a control means 31, which may be set to adjust the metering device 35 to desired amount of postage, sends a signal via a conductor 32 to a converter 33 and via a conductor 34 to a metering device 35. The metering device thus is set or preconditioned for its dispensing operation, but is not released or actuated for operation as yet. Converter 33 transmits a signal responsive to the value of postage to be dispensed via a data link 36 to a converter 37 and via a conductor 38 to a storage register 40, and via a conductor 39 also to an arithmetic unit 41. The storage register includes a comparison circuit and if the amount of credit in the register is larger than the value of the postage to be dispensed, a signal is sent from the register via conductor 38, converter 37, data link 36, converter 33 and conductor 42 to metering device 35, thereby causing actuation of the latter. If the required amount of credit is not present, the actuating signal is withheld and the metering device will fail to operate.

At the time the actuating signal is fed from the storage register 40 to the metering device, the amount of credit in storage is fed via the conductor 44 to the arithmetic unit 41 which previously received the signal responsive to the desired value to be dispensed. The arithmetic unit now performs the subtraction and feeds the new value via the conductor 45 to the storage register 40. The operation of the storage register in conjunction with an arithmetic unit, control means and so forth is well understood in the art of digital computers, see for instance Computer Logic—The Functional Design of Digital Computers (book), Ivan Flores, Prentice-Hall, Inc., Englewood Cliffs, New Jersey (1960), L. C. Catalog No. 60–16719, and High-Speed Data Processing (book), C. C. Gotlieb et al., McGraw-Hill Book Co., Inc., New York, N.Y. (1958), L. C. Catalog No. 57–12899.

It will be seen, therefore, that metering device 35 is permitted to operate only when proper credit is available at the central station. In this manner, the subscriber can be required to initially deposit a sum of money against which withdrawals are made.

FIGURE 4 depicts the arrangement wherein a plurality of subscriber stations are used which are each connected to a central station. In the present example, three identical subscriber stations 51, 52 and 53 are connected via a data link 54 to a large computer 55 disposed at the central station. Preferably, this computer is a digital unit including a control section, a storage register, an arithmetic unit and a read-out and printer unit. The digital computer may include magnetic memory drums of the random access type so that the credit of each subscriber can be checked speedily upon the receipt of the respective signal from the subscriber station. In this manner, it will be possible also to adjust the credit of each customer in a very fast manner to a new total whenever payment is made. For the billing of the individual customers, the read-out and printer unit is actuated which prepares statements responsive to the individual accounts maintained in the storage register. The operation of the various subscriber stations in combination with the computer is substantially identical with the arrangement and procedures described heretofore.

FIGURE 5 shows a circuit modification which is usable in conjunction with the embodiments shown in FIGURES 1 and 2. As discussed previously, the postage meter 11 is provided with a counter or accumulator indicated in FIGURE 5 by reference numeral 56. This accumulator accumulates the monetary values of the individual dispensing-imprinting operations. Whenever a predetermined sum, time or quantity of dispensing operations is reached, a signal representative of this cumulative value is transmitted from the accumulator 56, via the converters and the data link 14, to the registering device 16. In this manner, a single data link may be time shared by many subscriber stations. For example, the accumulator 56 may transmit a signal to the central station whenever the cumulative value reaches an increment of $10.00. Alternatively, the accumulator may accumulate data for periods of one or more hours and then transmit a signal representing the cumulative value; or may transmit a signal representing the cumulative value whenever a predetermined number of dispensing operations have occurred.

Figure 6:
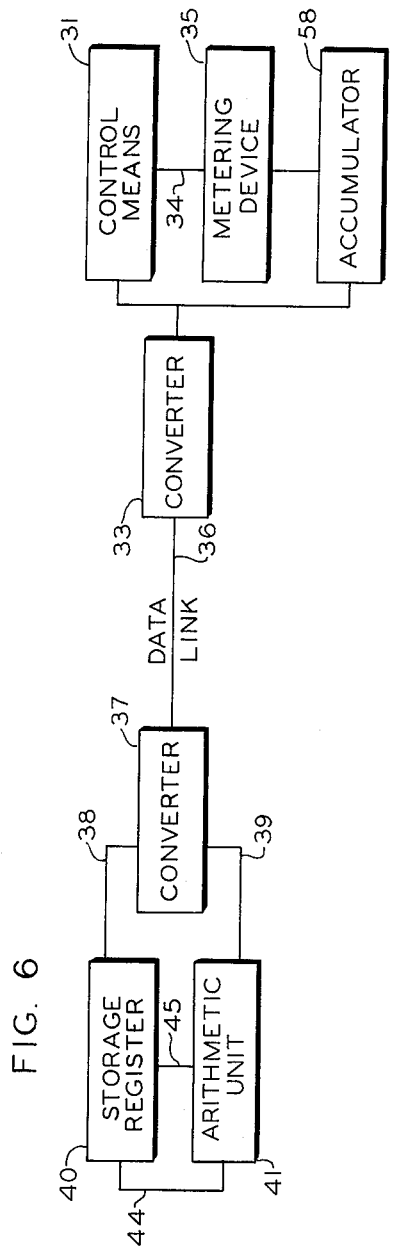
FIGURE 6 is a schematic block diagram of a modification of FIGURE 3.

FIGURE 6 shows a circuit modification which is usable in conjunction with the embodiments shown in FIGURES 3 and 4. In this embodiment the accumulator 58 accumulates the monetary values of the individual dispensing operations. Whenever a predetermined event occurs, for example, the dispensation of a predetermined increment of $10.00, a signal representative of the cumulative value is transmitted from the accumulator 58, via the converters and the data link 36, to the storage register 40 and arithmetic unit 41. The dispensed increment is subtracted from the credit balance in the storage register, and if the credit balance remaining is greater than the next predetermined increment, a signal is transmitted via the data link to the control means, releasing it for further operation. When the credit balance remaining is less than the next predetermined increment, a signal is transmitted via the data link to the control means, or some other effective portion of the postage meter, precluding further operation of the postage meter.

It will be apparent that the signals transmitted over data link 14, 24, 36 or 54 respectively, and interchanged between the subscriber and central stations may be of a coded or scrambled nature in order to forestall tampering with the metering device.

As has been indicated heretofore, the existing postage meters are equipped with registering or totalizing devices which indicate the value of postage dispensed. In order to provide a check for postal authorities, this particular portion of the meter may be retained sealed and may be inspected any time upon demand and compared with billings from the central station. In this manner, the metering devices installed at various subscriber stations remain subject to close audit by the cognizant authorities.

While there has been described and illustrated a preferred embodiment of the present invention and certain modifications thereof, it will be apparent to those skilled in the art that various further changes and modifications may be made therein without deviating from the principle and intent of the present invention which shall be limited only by the scope of the appended claims.

What is claimed is:

1. In a postage metering system, the combination of:
   a subscriber station comprising a postage meter including imprinting means for recurrently and selectively imprinting indicia representative of monetary value, and control means coupled to said meter for selectively adjusting the indicia to be imprinted by said meter;
   a remote accounting station including a totalizing means adapted to maintain information pertaining to the monetary value represented by the indicia imprinted by said postage meter;
   a data transmitting link coupling said postage meter at said subscriber station to said remote accounting station, and
   converter means coupled to said subscriber station and said transmitting link for providing data corresponding to the monetary value imprinted by said meter via said data link to said accounting station to maintain a record thereat of the monetary value of the indicia imprinted by said postage meter.

2. In a postage metering system as set forth in claim 1 including a plurality of subscriber stations; said remote accounting station including a plurality of totalizing means, and said transmitting link including means for selectively coupling each subscriber station to a respective totalizing means.

3. In a postage metering system as set forth in claim 1 and including an accumulating means for storing data indicative of the monetary value imprinted by said meter during an interim period disposed at said subscriber station and coupled to said postage meter and said converter means; and said converter means subsequently transmitting said stored data from said accumulating means over said data link to said accounting station.

4. In a postage metering system as set forth in claim 3 wherein said accumulating means stores data until a predetermined condition is reached and said converter means transmits the stored data to said accounting station upon the existence of said condition.

5. In a postage metering system as set forth in claim 4 wherein said predetermined condition is a predetermined increment of cumulative monetary value.

6. In a postage metering system as set forth in claim 4 wherein said predetermined condition is a predetermined increment of time.

7. In a postage metering system as set forth in claim 4 wherein said predetermined condition is a predetermined increment of imprinting operations.

8. In a postage metering system, the combination of:
   a subscriber station comprising a postage meter including imprinting means for recurrently and selectively imprinting indicia representative of monetary value, and control means coupled to said meter for selectively adjusting the indicia to be imprinted by said meter;
   accumulating means for storing information responsive to an incremental cumulative monetary value resulting from a plurality of indicia imprintings of said meter coupled to said subscriber station;
   a remote accounting station including a storage means to maintain information pertaining to the maximum cumulative monetary value of the indicia which said meter may imprint, and an arithmetic unit for processing said incremental cumulative monetary value information from said accumulating means with respect to said maximum value and thereby checking for a credit balance, and means for causing a control signal responsive to the status of such credit balance;
   a data transmitting link coupling said subscriber station to said accounting station;
   a converter means coupled to said subscriber station and said data link for receiving said incremental cumulative monetary value from said accumulating means and transmitting said value to said accounting station when said accumulating means reaches a predetermined condition; and
   said control means of said subscriber station coupled by means of said data link to said accounting station for receiving said control signal which provides for continued operation of said postage meter when a credit balance exists and blocks operation of said meter when the credit balance is exhausted.

9. In a postage metering system as set forth in claim 8 wherein a plurality of subscriber stations is provided, each such subscriber station being coupled by a data link to said remote accounting station, and said accounting station includes storage means associated with each of said subscriber stations for maintaining information pertaining to the monetary value of the indicia of the respective postage meter.

10. In a postage metering system as set forth in claim 8 wherein said accumulating means stores information responsive to a predetermined incremental cumulative monetary value, said converter means transmits such value to said accounting station, and said control signal provides for the continued operation of said postage meter when the credit balance is greater than the next succeeding predetermined incremental cumulative monetary value and inhibits operation of said postage meter when such credit balance is smaller than the next succeeding predetermined incremental value.

References Cited by the Examiner

UNITED STATES PATENTS 2,910,238  10/1959  Miles _____ 340—172.5

R. C. BAILEY, *Primary Examiner.*

G. D. SHAW, *Assistant Examiner.*